July 29, 1952 — L. THEISEN — 2,605,388
REMOTE CONTROLLED VEHICLE HEADLIGHT ADJUSTER
Filed Sept. 21, 1948
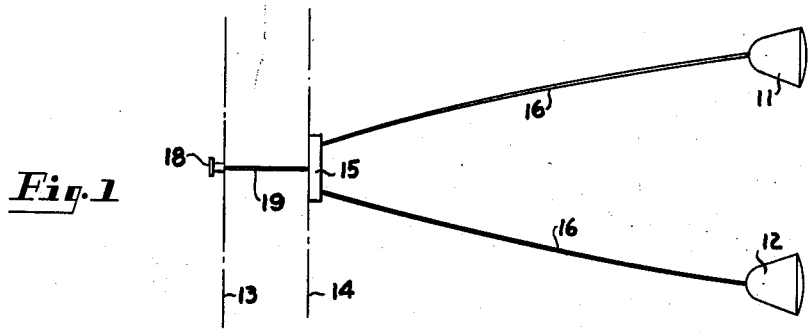
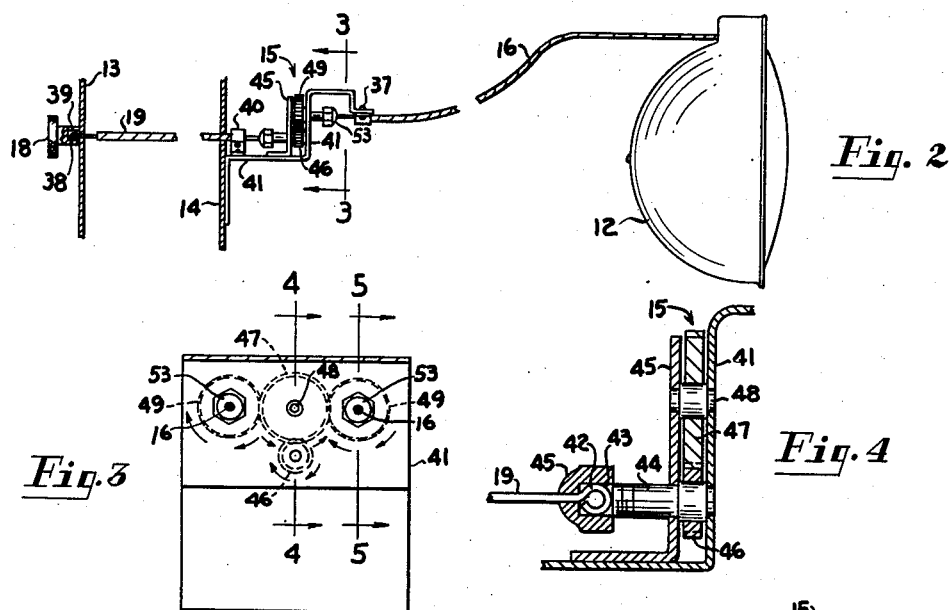
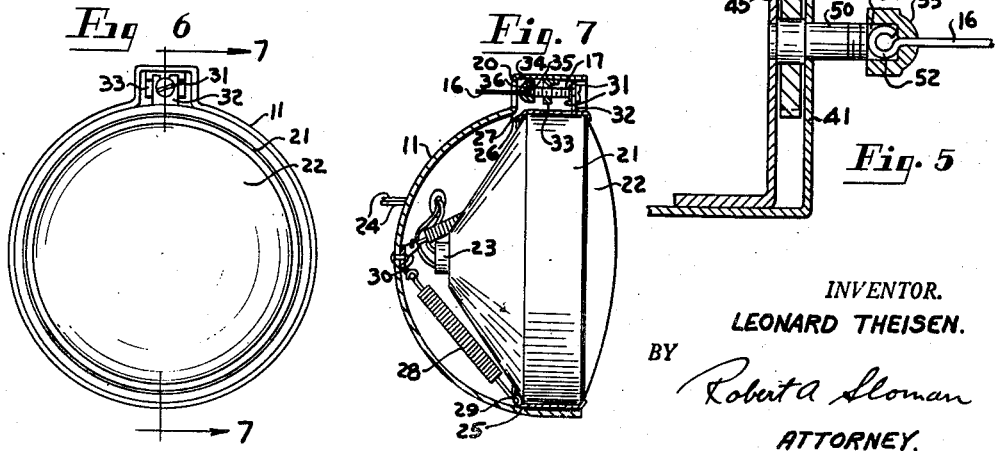
INVENTOR.
LEONARD THEISEN.
BY Robert A. Sloman
ATTORNEY.

Patented July 29, 1952

2,605,388

UNITED STATES PATENT OFFICE 2,605,388

REMOTE CONTROLLED VEHICLE HEADLIGHT ADJUSTER

Leonard Theisen, Detroit, Mich., assignor of twenty-five per cent to Robert Jackson, Detroit, Mich.

Application September 21, 1948, Serial No. 50,420

1 Claim. (Cl. 240—61.8)

This invention relates to a vehicle headlight adjusting device and more particularly to a remote manual control within the vehicle which is so connected with the vehicle headlight as to obtain forward or rearward tipping adjustments thereof.

Heretofore the conventional headlight is normally positioned within a headlight casing within some portion of the vehicle body, as for instance the front fenders thereof, and an adjusting screw is provided to initially set the inclination of the headlight with respect to its casing so that the headlights will be in proper focus.

It has been found depending upon the load or passengers carried in the vehicle that in view of the spring mounting of the vehicle body the headlights may be rendered out of proper focus or adjustment.

To provide a convenient method of readjusting the positioning of the headlight the present invention has for its principal object the provision of a manual control upon the vehicle dashboard which is suitably joined to the aforementioned headlight adjusting screw, as by a flexible cable, whereby a remote manual control for said adjusting screw is provided to obtain the proper inclination of the headlight with respect to its supporting casing.

It is the object of this invention to provide such manual control as will effect simultaneous adjustments of both vehicle headlights.

It is the further object of this invention to provide a single manual control upon the vehicle dashboard in association with a gear box which has a drive gear and a pair of interconnected driven gears, and with an adjusting cable respectively joining and interconnecting each of said driven gears with an adjusting mechanism for each of the vehicle headlights whereby the latter may be remotely adjusted in unison.

These and other objects will be seen from the following specification and claim in conjunction with the appended drawing in which:

Figure 1 is a diagrammatic plan view illustrating the spaced vehicle headlight casing, the remote manual control and the mechanism for effecting forward or rearward adjustments of the vehicle headlights within said casings.

Figure 2 is a partially sectioned and partially broken away elevational view illustrating the headlight adjusting mechanism.

Figure 3 is an elevational section taken on line 3—3 of Figure 2.

Figure 4 is an elevational section on line 4—4 of Figure 3.

Figure 5 is an elevational section on line 5—5 of Figure 3.

Figure 6 is a front elevational view of the headlight within its casing; and

Figure 7 is an elevational section on line 7—7 of Figure 6.

It will be understood that the above drawing illustrates merely a preferred embodiment of the invention and that other embodiments are contemplated within the scope of the claims hereafter set out.

Referring to the drawing Figure 1 diagrammatically illustrates a pair of spaced headlight casings 11 and 12 normally positioned and fixedly secured within corresponding openings formed in the vehicle front fenders.

The vehicle dash board is diagrammatically illustrated by the dash line 13, while the fire wall or metal frame work which extends across the front portion of the vehicle forwardly of said dash board and in spaced relation thereto is diagrammatically indicated by the dash line 14.

A gear box is generally indicated at 15 being mounted upon fire wall 14, there being a pair of spaced flexible cables 16 extending from said gear box and into the headlight casings 11 and 12 for operative engagement with the headlight adjusting screws 17 shown in Figure 17.

A manual control knob 18 is shown in Figure 1 extending from dash board 13, there being a suitable shaft or cable 19 interconnecting said knob and gear box 15 to effect rotation of cables 16 in one direction or the other in the manner hereafter fully set out.

Figures 2, 6 and 7 illustrate the general construction of one of the headlight casings, 11 for example, said casing being hollow and substantially concave, and having in the present embodiment a hollow central extension 20 within which is housed the headlight adjusting bolt or screw 17.

The vehicle headlight is generally indicated as 21, being of the present conventional sealed beam construction wherein the headlight, its lens 22, as well as its reflector and bulb are constructed and sold as a unit. Consequently in the specification and claims hereafter set out reference to the term headlight is intended to include this completed sealed beam construction, which as shown in Figure 7 includes a suitable bulb receiving socket 23 as well as a pair of openings therein for receiving the ends of electric conduits 24.

Referring to Figure 7 headlight 21 is adjustably positioned within casing 11 in such a manner that its bottom edge retainingly engages or is retainingly engaged by the interior lower surface of casing 11 of decreased diameter as at the point 25.

The corresponding top edge 26 of headlight 21 is adapted to cooperatively bear against the corresponding interior surface portion 27 whose diameter is slightly less than the maximum diameter of said headlight. A plurality of coiled springs 28, normally three, interconnect peripheral portions of headlights 21 as at the point 29, with the central bracket 30 which projects from the central interior portion of casing 11.

Springs 28 thus tend to maintain the headlight snugly within casing 11, and but for the manual adjustment of screw 17, would bring the top portion 26 of said headlight into engagement with the interior wall 27 of said casing.

Manually adjustable screw 17 has a pair of spaced shoulders 31 which retainingly engage the upright bracket 32 within a slot in its top. Said screw is in threaded engagement with and extends through a corresponding bracket 33 which projects from the interior top wall of casing extension 20.

By this arrangement it is clear that adjustment of the screw 17 as by a screw driver is adapted to effect forward or rearward tilting movements of said headlight within its supporting casing. This much of the description shows the standard conventional adjusting means for the headlight which is normally preset at the factory.

As hereafter set out the present invention provides merely a cable which is manually rotated from a remote point upon the dash board and which is joined at its outer end to the opposite end of this same adjusting screw 17 whereby upon rotation of said cable i. e. cable 16, the screw 17 will be rotated in one direction or the other thus providing a remote control device for adjusting the headlight.

The forward ends of each of the cables 16 as shown in Figure 7 extends through an opening at the rear of extension 20 with the flat looped portion 34 on the end of said cables projecting within the central transverse slot 35 formed within the inner end of the screws 17.

The hollow cap nut 36 extends over cable 16 as well as over its end loop 34 and is threadably secured to the end of screw 17 to effectively retain said loop within screw slot 35.

The opposite ends of each of the cables 16 extend rearwardly from casings 11 and through the supporting bracket 37 as shown in detail in Figure 2.

Manually rotatable handle 18 on dash board 13 has a similar narrow slot 38 at its inner end to retainingly receive a flat loop 39 formed at one end of the actuating cable or shaft 19. The other end of shaft 19 projects through fire wall 14 and through the guide 40 positioned upon the bracket 41 suitably secured to the outer surface of fire wall 14.

As shown in Figure 4 the outer end of shaft 19 also has a flat loop 42 operatively positioned within a transverse central slot 43 in the outer end of gear driving shaft 44 and is retained therein by the cap nut 45 threaded upon the outer end of said shaft.

Shaft 44 extends through an opening in the upright bracket 45 which is secured upon bracket 41, with the upright portions of both brackets being arranged in parallel spaced relation to define the gear box generally indicated by the numeral 15.

Pinion gear 46 is positioned within gear box 15 and secured upon the inner end of driving shaft 44 for rotation in accordance with manual rotation of the handle 18.

As shown in Figures 3 and 4 pinion 46 is in mesh with idler gear 47 rotatably journalled within gear box 15 by means of its central shaft 48, and said gear in turn is in mesh with the two cable driving gears 49 Figure 5 arranged upon opposite sides thereof and within said gear box, as also illustrated in Figures 3 and 4.

Both of said gears 49 have central shafts 50 for rotatably journalling and supporting said gears within gear box 15 and in operative meshing engagement with the idler 47. Said shafts project through bracket 41, one of which shafts is shown in Figure 5. Said shafts have central transverse slots 51 at their outer ends to receive the flat loops 52 formed upon the inner ends of screw adjusting cables 16.

Here also suitable cap nuts 53 are adapted to retainingly engage the loops 52 and are threaded upon the outer ends of shafts 50 to thereby transmit the rotative motion of said shafts to the respective cables 16.

By the above construction it is apparent that rotation of knob 18 in either direction will effect a corresponding rotation in either direction of both of the cable driving gears 49 in unison for causing corresponding rotary adjustments of the headlight adjusting screws 17, through the intermediate flexible cables 16.

Consequently such remote controlled adjustments of the screws 17 will effect the same forward or rearward pivotal adjustments of the headlights 21 with respect to their supporting casings 11 and 12, and will thus serve as an effective device for resetting and refocusing said headlights when the vehicle carries a load.

Having described my invention, reference should now be had to the claim which follows for determining the scope thereof.

I claim:

In combination, a pair of spaced vehicle headlight casings, an upright headlight within each casing with its lower portion resting upon the same and tiltable thereon, a rotatable bolt loosely journaled and secured against longitudinal movement upon the upper portion of each headlight and threadably engaging its casing for effecting forward and rearward tilting movements of said headlights relative to their casings, a pair of remotely rotated cables joined at their one ends to said bolts respectively for rotating the same, a gear box including a pair of spaced driven gears, an intermediate idler gear therebetween and a drive gear in mesh with said idler gear, with said driven gears respectively joined to the other ends of said cables, and a remotely manually rotated shaft joined to said drive gear.

LEONARD THEISEN.

REFERENCES CITED

The following references are of record in the file of this patent:

UNITED STATES PATENTS

| Number | Name | Date |
| --- | --- | --- |
| 1,367,318 | Horton | Feb. 1, 1921 |
| 1,585,335 | Farwell | May 18, 1926 |
| 1,617,463 | Sineath | Feb. 15, 1927 |
| 1,796,192 | Doms et al. | Mar. 10, 1931 |
| 1,970,331 | McCoy | Aug. 14, 1934 |
| 2,105,866 | Sheaffer | Jan. 18, 1938 |
| 2,138,075 | Taylor et al. | Nov. 29, 1938 |

FOREIGN PATENTS

| Number | Country | Date |
| --- | --- | --- |
| 612,669 | France | Aug. 3, 1926 |